Nov. 9, 1948.
C. L. EMMONS
2,453,503
METHOD OF ATTACHING TEAR STRIP
WINDING KEYS TO RECEPTACLES
Filed Feb. 21, 1944
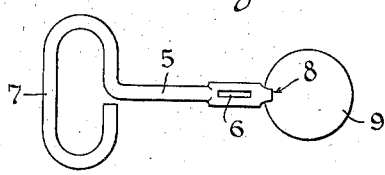
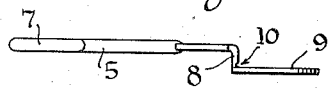
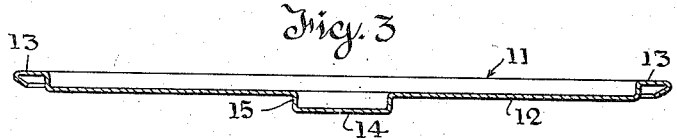
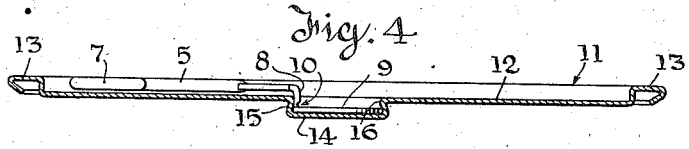
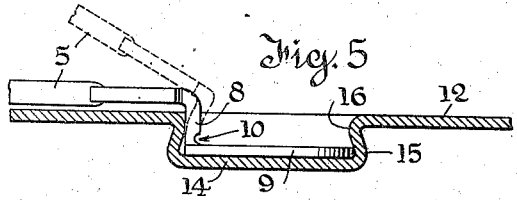
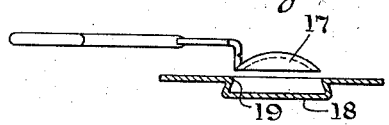
Inventor
C. L. Emmons
By
Mason, Porter & Diller
Attorneys Patented Nov. 9, 1948

2,453,503

UNITED STATES PATENT OFFICE 2,453,503

METHOD OF ATTACHING TEAR STRIP WINDING KEYS TO RECEPTACLES

Clarence L. Emmons, Jersey City, N. J., assignor to Continental Can Company, Inc., New York, N. Y., a corporation of New York Application February 21, 1944, Serial No. 523,286

3 Claims. (Cl. 29—148)

The invention relates generally to metallic receptacles of the well known tear strip type which are opened by tear strip winding keys temporarily secured to the receptacles during the manufacture thereof, and it primarily seeks to provide a novel method of effecting temporary attachment of this type of key to a receptacle.

Metallic receptacles of the character stated including the end closures thereof frequently are internally, or externally, or both internally and externally coated with lacquer, or similar protective coatings and the tear strip winding keys usually are attached by soldering or welding. It has been found that the application of heat incident to this key attachment by soldering or welding is injurious to said protective coatings, and the present invention seeks to remedy this objectionable condition by providing a novel method of attaching keys of this type enabling the keys to be temporarily held in place on the containers by retaining friction and without the necessity of applying heat.

Another object of the invention is to provide a novel method of temporarily attaching a tear strip winding key to a metal receptacle, said key comprising a main body composed of a slotted shank and head, and an offset shank extension having a weakening groove thereacross and merging into a mounting head just below said groove and adapted to be secured in a recess in the metal receptacle, said method consisting in placing the mounting head in a receptacle recess defined by side wall portions, and deforming said mounting head in the recess in a manner for causing side wall portions of the recess to overhang said mounting head and secure it in the recess.

Another object of the invention is to provide a novel method of the character stated in which the key mounting head securing recess wall portion overhang is brought about by flattening a convexity in the key mounting head thereby to laterally extend the peripheral edge of the head to underlie wall portions defining the recess.

With the above and other objects in view that will hereinafter appear, the nature of the invention will be more clearly understood by reference to the following detailed description, the appended claims, and the several views illustrated in the accompanying drawings.

Figure 1 is a plan view illustrating one form of tear strip winding key adapted to the practicing of the invention.

Figure 2 is an edge view of the key shown in Figure 1.

Figure 3 is a vertical cross section illustrating an end closure or metallic receptacle part to which the key is to be temporarily secured.

Figure 4 is a view similar to Figure 3 illustrating the key temporarily secured to the end closure or receptacle part.

Figure 5 is an enlarged fragmentary sectional view illustrating the central portion of the structure illustrated in Figure 4, the bending up of the main body of the key so as to break it off from the extension secured in the recess being indicated in dotted lines.

Figure 6 is a view illustrating another form of key end extension adapted for the novel method of attachment in a receiving recess in a metal receptacle part.

Figure 7 is a fragmentary sectional view illustrating the key of Figure 6 mounted and temporarily secured in a receptacle part recess.

In the form of the invention illustrated in Figures 1 through 5, the tear strip winding key comprises a shank 5 having the usual tear strip receiving slot 6 therein, and the usual turning head 7. In the practical development of the invention the shank is provided with an offset or angular extension 8, and the extension in turn is equipped with a mounting head extension 9 which in the present illustration takes the form of a flat circular head disposed in a plane parallel to and spaced from the plane in which the main body portion 5, 7 of the key lies.

It will be observed by reference to Figures 2, 4 and 5 of the drawing that the offset shank portion 8 is provided with a weakening groove 10, extending thereacross and which makes it possible to readily break the main key portion 5, 7 away from the mounting head extension 9 by relative bending of the parts in the manner illustrated in dotted lines in Figure 5.

An end closure is herein illustrated as the metallic receptacle part to which the key may be temporarily secured. It is to be understood, however, that the key may be temporarily secured to a top or bottom end closure, or even to a body portion of a metal receptacle. The end closure is generally designated 11 and includes a depressed main central body portion 12 and an outwardly extended flange portion 13 is adapted to be seamsecured to a container body of the rip strip type in the conventional manner. The depressed central body portion 12 is provided with a recess or depression 14 defined by an upright wall 15 of a diameter for readily receiving the mounted head extension 9 of the key.

In temporarily securing the key to the end closure, the mounting head 9 thereof is inserted in the bottom of the recess 14, and upper portions of the recess defining wall are caused to overhang the mounting head 9, as at 16, and by this means secure the mounting head in the recess. The overhanging of wall portions over the mounting head 9 may be brought about by hammering the head 9 so as to cause peripheral edge portions thereof to indent the recess defining wall, or upper portions of said walls may be clinched so as to provide the desired overhang. The key is temporarily attached or secured to the end closure, in the manner clearly illustrated in Figure 5, and when it is desired to remove the key and apply it to the tear strip of the receptacle in order to wind said strip and effect an opening of the receptacle, it is only necessary to grasp the turning head 7 and lift the main body of the key in the manner illustrated in dotted lines in Figure 5, thereby to break off the key at the weakened portion 10 thereof, as hereinbefore stated.

In the form of the invention shown in Figures 6 and 7, the mounting head extension of the key is dome shaped or convex, as at 17. The metallic receptacle recess 18 may be provided with initially overhanging wall portions, as at 19, dimensioned to permit free insertion of the dome shaped mounting head 17 in the manner clearly illustrated in Figure 6. With the parts thus formed it will be observed that by flattening out the mounting head in the manner indicated at 20 in Figure 7, the peripheral edge portion of said head will spread out under the overhanging wall portions 19 and the mounting head will thus be secured in the recess, and since the offset shank extension connects with and extends perpendicularly upwardly from the base of the mounting head 17 at its edge extremity it necessarily follows that said extension will be pressed tightly against the recess defining wall in a manner for holding the mounting head against turning in said recess. The invention also comprehends the formation of the recess in the manner illustrated in Figure 3, and the flattening out of the convex mounting head in a manner for causing peripheral edge portions thereof to become indented in the recess defining wall in a manner for effecting the securing of the key to the receptacle part.

By following any of the practices hereinabove described, the key mounting head is secured in the receptacle recess with the main body of the key outside the recess and closely paralleling the adjacent wall portion of the receptacle part so that it cannot be readily engaged in a manner for being inadvertently displaced. The key may be readily manipulated to effect its removal in the manner illustrated in Figure 5, as previously described.

It will be apparent by reference to Figures 5, 6 and 7 of the drawings that when the mounting head 9 or 17 is placed in the can end recess 14 or 18 the weakening groove across the angularly offset shank extension is placed well down in the recess beneath the plane of the main control body portion 12 of the can end so that when the key is broken away the mounting head retained in the recess will be devoid of any raw metal edge portion projecting out of the recess into position for being contacted by a user of the container on which the can end is applied.

It is to be understood that the specific structural details and part arrangements herein described may be variously changed without departing from the spirit and scope of the invention as defined in the appended claims.

I claim:

1. A method of temporarily securing a tear strip winding key having a main body including a slotted shank and a turning head and an angularly offset shank extension with a weakening groove thereacross and a circular mounting head extending from the shank extension in a plane paralleling the plane in which said main body lies to a can end having a wall defined circular recess centered therein which consists in bringing said can end and key together with the mounting head in the recess with the shank extension groove well down in the recess within the depth of the recess defining wall, and reshaping recess defining wall portions while maintaining the fixed position of the key by peripherally spreading the edges of said mounting head thereby to present wall portions in overhanging relation to the defining edges of the mounting head and effective to retain the same in the recess so that upon lifting of said main body portion it can be broken away at the weakened shank groove without pulling away said mounting head and without leaving any raw metal edges extended above the wall defined recess.

2. A method of temporarily securing to a metallic receptacle part having a wall defined recess therein a tear strip winding key having a main body including a slotted shank and a turning head and a flat angularly offset shank extension with a weakening groove thereacross and a convex mounting head extending at its periphery from the shank extension in a plane paralleling the plane in which said main body lies and conforming in shape to said recess and dimensioned to closely fit therein, said method comprising bringing the receptacle part and key together with the mounting head in the recess, said shank groove being so dimensioned with relation to said head as to be positioned below the upper extremity of said recess, and reshaping recess defining wall portions to present wall portions in overhanging relation to the mounting head to retain the same in the recess by flattening out said convex mounting head so as to spread it peripherally into engagement with the recess defining wall with the flat shank pressed tightly against said wall whereby the mounting head is held against turning and upon lifting of said main body portion it can be broken away at the weakened shank groove without pulling away said mounting head.

3. A method of temporarily securing a tear strip winding key having a main body including a slotted shank and a turning head and an angularly offset shank extension with a weakening groove thereacross and a circular mounting head extending from the shank extension in a plane paralleling the plane in which said main body lies to a can end having a wall defined circular recess centered therein which consists in bringing said can end and key together with the mounting head in the recess with the shank extension groove well down in the recess within the depth of the recess defining wall, and reshaping recess defining wall portions while maintaining the fixed position of the key to present wall portions in overhanging relation to the defining edges of the mounting head and effective to retain the same in the recess so that upon lifting of said main body portion it can be broken away at the weakened shank groove without pulling away said mounting head and without leaving any raw metal edges extended above the wall defined recess.

CLARENCE L. EMMONS.

REFERENCES CITED

The following references are of record in the file of this patent:

UNITED STATES PATENTS

| Number | Name | Date |
|---|---|---|
| 1,817,710 | Rollason | Aug. 4, 1931 |
| 1,950,156 | Swoboda | Mar. 6, 1934 |
| 2,029,329 | Ljungstrom | Feb. 4, 1936 |
| 2,047,250 | Bardet | July 14, 1936 |
| 2,146,388 | Wade | Feb. 7, 1939 |
| 2,277,108 | Jackson | Mar. 24, 1942 |
| 2,304,833 | Korwan | Dec. 15, 1942 |
| 2,365,100 | O'Brien | Dec. 12, 1944 |